M. C. SCHOW.
ANTISKID CHAIN ATTACHMENT.
APPLICATION FILED FEB. 21, 1920.
1,354,624.
Patented Oct. 5, 1920.
2 SHEETS—SHEET 2.
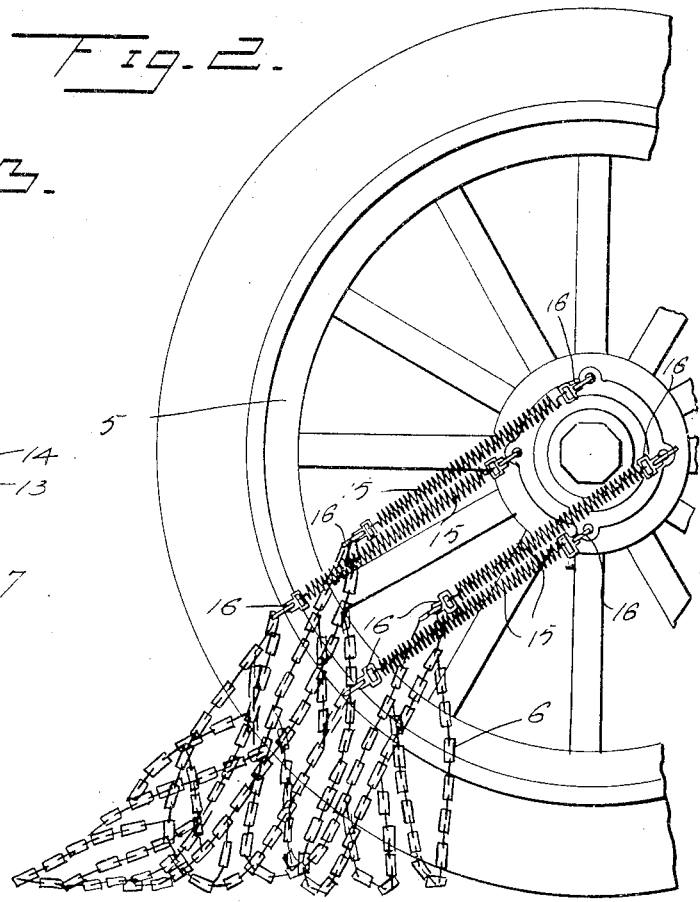
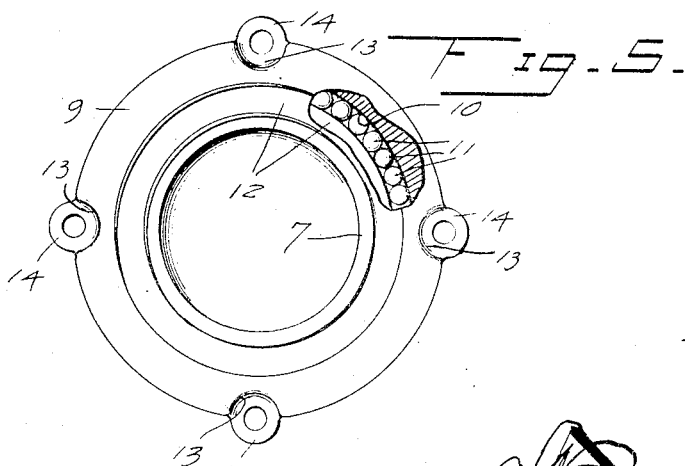
Inventor
M.C. Schow

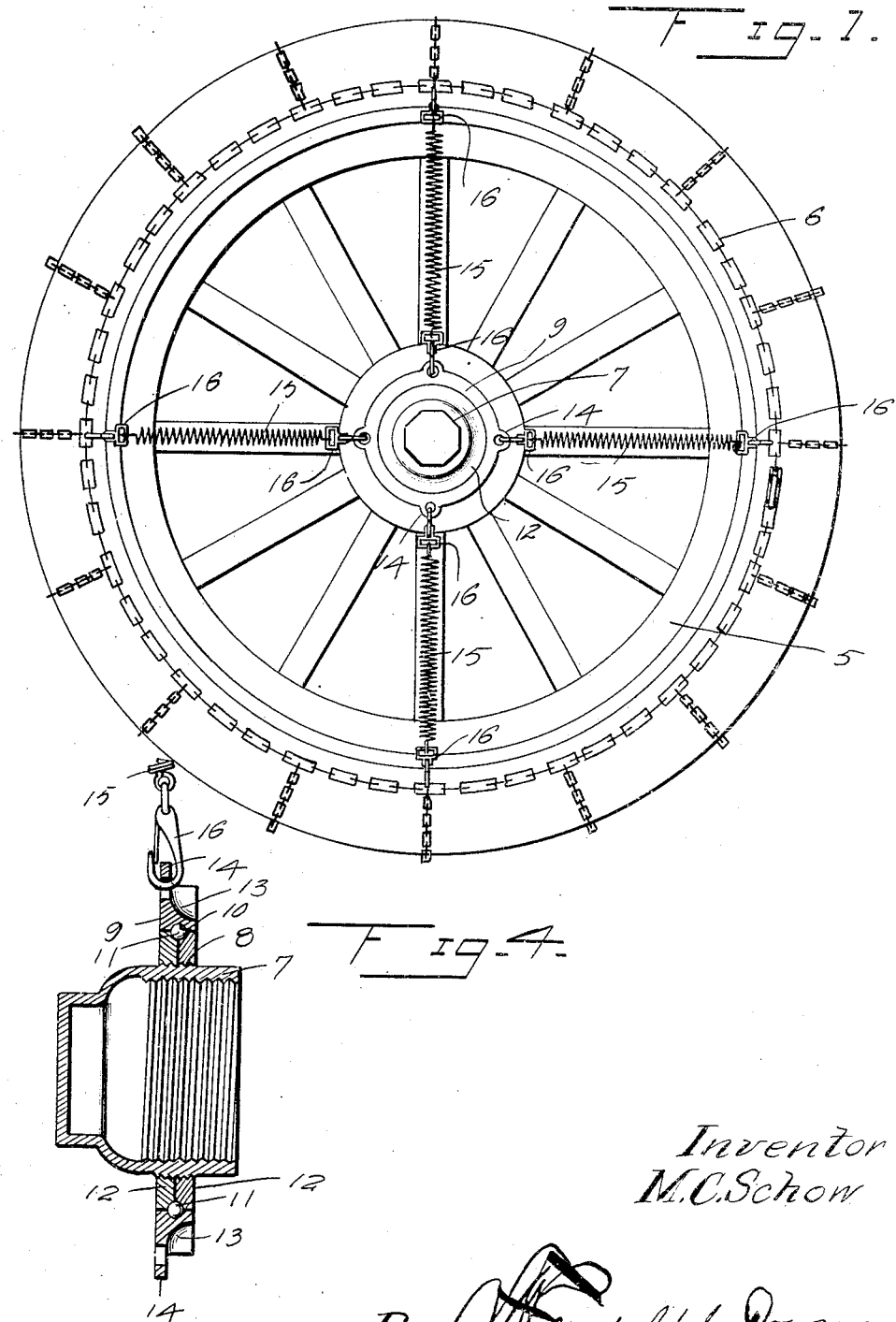

UNITED STATES PATENT OFFICE.

MARTIN C. SCHOW, OF VANANDA, MONTANA.

ANTISKID-CHAIN ATTACHMENT.

1,354,624.   Specification of Letters Patent.   Patented Oct. 5, 1920.

Application filed February 21, 1920. Serial No. 360,358.

*To all whom it may concern:*

Be it known that I, MARTIN C. SCHOW, a citizen of the United States, residing at Vananda, in the county of Rosebud and State of Montana, have invented certain new and useful Improvements in Antiskid-Chain Attachment; and I do hereby declare the following to be a full, clear, and exact description of the invention, such as will enable others skilled in the art to which it appertains to make and use the same.

My invention relates to anti-skid chain attachments, the principal object of the invention residing in the provision of a device which will retain the anti-skid chain in taut position on the tire and prevent the loss of the chain should the same become broken at any point or the fastenings of the chain become detached.

A further object of the invention is to provide an automobile anti-skid chain attachment which will positively prevent a chain from becoming lost and will always retain the chain in such relation on the tire as to allow the same to creep slightly thereby preventing the parts of the chain from becoming subjected to strain.

Still another object of the invention is to provide an attachment of this type wherein all of these parts are mounted upon the usual hub cap of the vehicle wheel thereby rendering the attachment readily attached and detached from the anti-skid chain.

It is another object of the invention to provide an automobile anti-skid chain attachment which is mounted upon the usual hub cap so that the hub cap can rotate independently of the attachment, the attachment being mounted in a novel manner on the hub cap to overcome friction between these parts.

Another general object of the invention is to provide a device of the above character which is simple in construction, consists of few parts and can be manufactured and sold at a minimum cost.

With the above and other objects and advantages in mind, the invention consists in the novel combination of elements, construction and arrangements, operations and specific features all of which will be hereinafter enlarged upon and recited in the subjoined claims, the invention being illustrated in the attached drawing, wherein:

Figure 1 is an elevation illustrating the attachment in operative position on the vehicle wheel and engaged with the anti-skid chain;

Fig. 2 is a similar view illustrating the anti-skid chain disengaged from the tire and being dragged by the attachment;

Fig. 3 is an edge elevation of the attachment removed from the wheel;

Fig. 4 is a vertical sectional view of the device removed from the wheel.

Fig. 5 is a perspective of one of the connections between the attachment and anti-skid chain.

Referring in detail to the drawing wherein like characters of reference denote like parts in all the views the numeral 5 designates a conventional automobile wheel upon the tire of which is mounted the usual anti-skid chain designated at 6. The parts referred to are merely illustrated to show the application of my attachment which consists of a hub cap 7 provided with exterior screw threads 8 at a point centrally of its ends. Encircling the hub cap 7 and disposed in spaced relation thereto and at a point intermediate its ends is an annulus 9. Ball retaining rings 12 are threaded upon the hub cap 7 and are flush with the opposite faces of the annulus. The opposed faces of the annulus 9 and the rings 11 are formed with coinciding annular ball retaining grooves 10 in which a plurality of anti-friction balls 11 are arranged, this being clearly illustrated in Fig. 4.

The inner face of the annulus 9 is provided with a plurality of radially disposed recesses 13 while the outer face of the annulus is formed with a plurality of radially disposed perforated ears 14 each of which coincides with one of the recesses 13 and projects outwardly beyond the peripheral face of the annulus.

There is provided a plurality of contractile springs 15 which carry snap-hooks or other fastenings 16 in their extremities, the snap-hooks at the outer ends of the springs being detachably engaged with the anti-skid chain while the snap-hooks at the opposite ends of the springs are detachably engaged with the perforated ears.

From the disclosure it will be obvious that should the anti-skid chain become detached from the tire or broken at a point between any two of the contractile springs the chain will be dragged along and thus be prevented from becoming lost.

It will also be stated that when the anti-skid chain is not in use the snap fastenings at the inner ends of the springs may be disengaged from the ears and the springs left associated with the chain so that in applying the chain it will only be necessary to engage these snap fastenings with the perforated ears. If desired the spring elements may be disassociated from the chain as well as the ears and stored in any convenient place in the automobile.

The construction illustrated and described is a practical embodiment of the invention but it will be understood that changes may be made therein and that my limits of such changes are only governed by what is claimed.

What is claimed is:—

1. In a device of the character described a thimble to be mounted on a rotating hub, a pair of rings threaded on the thimble and provided with an anti-friction ball groove, an annulus encircling the ring and also provided with a groove coinciding with the first mentioned groove, anti-friction elements terminating within the groove, and means adapted for connection with the annulus and an article to be retained against loss.

2. An anti-skid chain attachment comprising the combination with a wheel and rotating hub, of a thimble removably mounted thereon, a ring element threaded on said thimble and having an annular anti-friction ball groove, an annulus encircling the ring element and also provided with a groove coinciding with the first mentioned groove, anti-friction elements within said grooves, perforated ears projecting from said annulus, and anti-skid chain connecting springs removably engaged with said perforated ears.

In testimony whereof I affix my signature in presence of two witnesses.

MARTIN C. SCHOW.

Witnesses:
S. SIGMAN,
L. A. JACOBSEN.